(12) United States Patent
Miller et al.

(10) Patent No.: US 10,909,796 B2
(45) Date of Patent: Feb. 2, 2021

(54) SYSTEM AND METHOD FOR GENERATING AND DISPLAYING A HORSE RACING FORM FOR USE WITH A VIRTUAL HORSE RACE

(71) Applicants: Mark E. Miller, Castle Rock, CO (US); Jonathon Spaeth, Pensacola, FL (US)

(72) Inventors: Mark E. Miller, Castle Rock, CO (US); Jonathon Spaeth, Pensacola, FL (US)

(*) Notice: Subject to any disclaimer, the term of this patent is extended or adjusted under 35 U.S.C. 154(b) by 1022 days.

(21) Appl. No.: 14/318,353

(22) Filed: Jun. 27, 2014

(65) Prior Publication Data

US 2014/0315609 A1    Oct. 23, 2014

Related U.S. Application Data

(62) Division of application No. 12/052,987, filed on Mar. 21, 2008, now abandoned.

(60) Provisional application No. 60/926,334, filed on Apr. 26, 2007.

(51) Int. Cl.
*A63F 9/24* (2006.01)
*G07F 17/32* (2006.01)
*A63F 13/00* (2014.01)

(52) U.S. Cl.
CPC ............ *G07F 17/32* (2013.01); *A63F 13/005* (2013.01); *A63F 2300/64* (2013.01); *A63F 2300/65* (2013.01); *A63F 2300/8058* (2013.01)

(58) Field of Classification Search
CPC .............................. G07F 17/3288; G06Q 50/34
See application file for complete search history.

(56) References Cited

U.S. PATENT DOCUMENTS

| | | |
|---|---|---|
| 5,186,460 A | 2/1993 | Fongeallaz et al. |
| 5,411,258 A | 5/1995 | Wilson |
| 5,513,103 A | 4/1996 | Charlson |
| 6,089,981 A | 7/2000 | Brenner |
| 6,292,706 B1 | 9/2001 | Birch |
| 6,450,889 B1 | 9/2002 | Mendes, Jr. |

(Continued)

FOREIGN PATENT DOCUMENTS

JP    101656644    6/1998

*Primary Examiner* — David L Lewis
*Assistant Examiner* — Eric M Thomas
(74) *Attorney, Agent, or Firm* — Dergosits & Noah LLP

(57) ABSTRACT

The present invention is a system and method for generating and displaying a horse racing form for a completely virtual horse racing environment. The present invention stores a database of values for a virtual horse, each value corresponding to an attribute typically listed in a published daily racing form. In order to simulate horse racing performance, calculations are applied to the values, which are adjusted to account for an individual horse's running style, track preference, track condition preference, age, or other factors. The results of these calculations are then displayed on a horse racing form. Users of the present invention will be able to place educated bets, or handicap, using the horse racing form. The form may be used in a number of open or closed environments. As a result, the present invention provides a complete virtual horse racing environment based upon fully calculated and realistically weighted mathematical algorithms used to generate the horse racing form.

16 Claims, 4 Drawing Sheets

(56) References Cited

U.S. PATENT DOCUMENTS

| | | |
|---|---|---|
| 6,699,126 B2 | 3/2004 | Kusuda |
| 6,805,629 B1 | 10/2004 | Weiss |
| 6,860,806 B2 | 3/2005 | Kojima |
| 2002/0034981 A1* | 3/2002 | Hisada .................... G07F 17/32 463/42 |
| 2002/0072401 A1 | 6/2002 | Tomaru |
| 2002/0077712 A1 | 6/2002 | Safaei |
| 2003/0054870 A1 | 3/2003 | Sato |
| 2003/0119570 A1 | 6/2003 | Maroun |
| 2004/0058731 A1* | 3/2004 | Rossides ................ G06Q 50/34 463/42 |
| 2004/0111358 A1* | 6/2004 | Lange .................... G06Q 40/04 705/37 |
| 2004/0005921 A1 | 8/2004 | Shinoda |
| 2005/0044575 A1 | 2/2005 | Der Kuyl |
| 2005/0131868 A1 | 6/2005 | Lin et al. |
| 2005/0208995 A1 | 9/2005 | Marshall |
| 2006/0084483 A1 | 4/2006 | Shin |

\* cited by examiner

| | 203 | 205 | 207 | 209 | 211 | 213 | 215 | 217 | 219 | 221 | 223 | 225 | 227 | 229 | 231 | 233 | 235 |
|---|---|---|---|---|---|---|---|---|---|---|---|---|---|---|---|---|---|
| 03-06-2007 | EID | fast | Cherry Blossom | $250000 | I. F | 6.0F | 22.9 | 46.1 | 59.2 | 71.7 | 2.29 | 1 2.79 | 4 1.20 | 9 1.84 | Go For Broke | Banjovee | Harmony's |
| 02-27-2007 | EID | fast | Lexington | $50000 | I. F | 9.0F | 45.9 | 69.4 | 95.0 | 107. | 4.59 | 1 0.58 | 5 6.19 | 7 7.12 | Parlor Tricks | Harmony's | Always Run |
| 02-17-2007 | EID | wet | Arlington | $200000 | W. Y | 12.0F | 45.9 | 69.4 | 94.9 | 143. | 4.59 | 1 0.58 | 8 6.51 | 11 14.7 | Fortunate | Harmony's | Go For Broke |
| 02-11-2007 | EID | fast | Handicap | $40000 | I. F | 10.0F | 45.9 | 69.4 | 94.9 | 119. | 4.59 | 1 0.58 | 8 6.51 | 9 9.52 | Apollo | Jupiter | Harmony's |
| 01-14-2007 | EID | fast | Alabama | $50000 | I. F | 6.5F | 23.3 | 46.1 | 59.4 | 78.1 | 1.16 | 1 5.71 | 4 0.35 | 3 1.63 | Always Run | Lucky Run | My Bride |

FIG. 2

SYSTEM AND METHOD FOR GENERATING AND DISPLAYING A HORSE RACING FORM FOR USE WITH A VIRTUAL HORSE RACE

RELATED APPLICATION DATA

This application is a divisional of U.S. patent application Ser. No. 12/052,987, entitled "SYSTEM AND METHOD FOR GENERATING AND DISPLAYING A HORSE RACING FORM FOR USE WITH A VIRTUAL HORSE RACE," filed on Mar. 21, 2008, which is a nonprovisional utility patent application which claims priority under 35 U.S.C. § 119(e)(1) to provisional patent application No. 60/926,334, filed on Apr. 26, 2007.

TECHNICAL FIELD

The present invention relates generally to virtual horse racing, and specifically, to a method and system for creating a completely virtual horse racing environment, with virtual horses, a virtual racetrack, and a horse racing form generated and displayed using data on the virtual horses.

BACKGROUND OF THE INVENTION

Horse racing has been a popular sport for centuries. Horse racing has traditionally involved a substantial gambling aspect in addition to the race itself. Those familiar with this aspect know that successful gambling results require more than blind reliance on luck and chance. There is a significant analysis of a race horse's information and record of past performance. This analysis and subsequent educated betting based on this analysis is known as "handicapping." It is common for a horse racing handicapper to use tools such as a horse racing form in order to place educated bets on horse races. A typical horse racing form tracks a race horse's historical data, from how the horse performed in certain track, distance and environmental conditions, to how the horse performed relative to other horses. In addition, the horse's weight, age, and genealogy are summarized. In some cases, jockey and trainer information is also listed. A traditional racing form may be presented in a broadsheet or newspaper-like printout, such as those published by Daily Racing Form, LLC.

While horse racing is popular, it is also known to be dangerous to the horses and their jockeys. As a result, many have tried to capture the excitement and skill from horse racing without involving real horses or jockeys. For example, there have been many mechanical and computer video games made. While these parlor games simulate the movement of horses around a track, they lack the analytical skills involved in reading and placing bets based on a horse racing form. The advent of the internet has led to many attempts to present online virtual horse racing; however, these internet websites also are lacking for one reason or another. For instance, some internet horse racing websites merely track the performance of actual horse races, providing a virtual jockey club for participants. Other internet horse racing sites simulate horse racing statistics using a random number generator, but this leaves the outcome of the race up to luck without considering the merits of a true horse racing form. Still other sites simulate horse race results, but use modified pre-existing racing forms. These sites still rely on real horse races for data, which does not prevent harm to the horses or their jockeys.

What is therefore needed is a way to capture the excitement of a horse race and combine it with the skill involved in handicapping without involving live horses and jockeys. What is needed is a virtual horse racing jockey club that utilizes a virtual horse racing form that is as true to reality as possible. What is further needed is a simulated horse race environment that uses data from the horse racing form in a true-to-life weighted manner, such that data is continuously generated from virtual horse races, and consistently updated on the racing form.

SUMMARY OF THE INVENTION

It is an object of the present invention to provide a virtual horse racing form for use in handicapping a completely virtual horse racing environment without any reliance on any real race horses. One skilled in the art will appreciate that while the horse racing form aspect of the present invention is itself not virtual, the data upon which the racing form is based uses data from virtual horses. As referred to herein, the racing form for virtual horses is the virtual horse racing form, which can be coupled to a virtual horse racing environment, or can be used to support other virtual horse racing environments from other providers. The present invention provides a system and method of creating a virtual horse racing environment that displays a three-dimensional depiction of a horse race, without any reliance on actual real-world horse races or real-world data. The present invention may be displayed and utilized in a variety of environments, from a web-based application, to a casino environment, to a "closed" single-institution, single-platform or single-computing environment, to an "open" virtual world environment. Further, the present invention provides a continuously updated virtual horse racing form based upon the results of the virtual horse race, whereby the form captures all of the information that would typically be found in a traditional printed horse racing form, but adapted and updated for the virtual jockey club environment. Additionally, the present invention permits users to buy, sell, train and race virtual horses in the virtual horse racing environment.

BRIEF DESCRIPTION OF THE FIGURES

FIG. 2 is an exemplary screenshot showing another virtual racing form embodiment of the present invention.

DETAILED DESCRIPTION OF THE INVENTION

Figure 1:
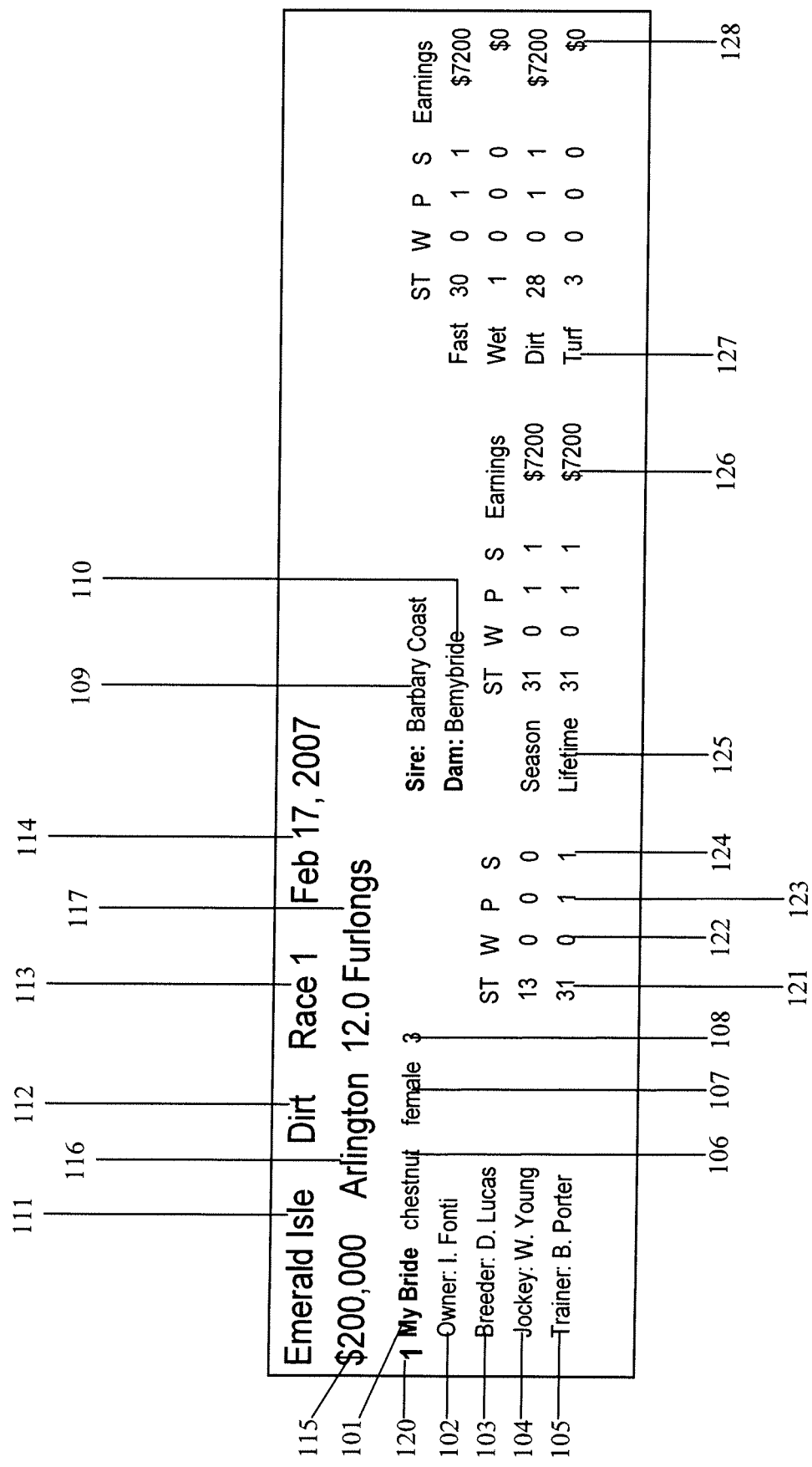
FIG. 1 is an exemplary screenshot showing a virtual racing form embodiment of the present invention.

What is disclosed is a system and method for generating, storing and updating a virtual horse racing form. An embodiment of the virtual horse racing form supplies the data needed to complement a completely virtual horse racing environment, including virtual horses, virtual jockeys and virtual trainers. The present invention provides a data form that displays current and historical statistical information for each virtual horse in a virtual race. This allows a handicapper to analyze the form for a virtual horse race and place an educated bet in the same way as he or she does at a real track.

Aspects of the present invention may be stored on a computer accesses over a network. A user may access the computer directly, or through the network. As such, aspects of the present invention may form part of a hosted website.

One skilled in the relevant art will appreciate that the terms "network," "computer network," and "online" may be used interchangeably and do not imply a particular network embodiment or topography. In general, any type of network (e.g., LAN, WAN, SAN or internet) may be used to implement the online or computer networked embodiment of the present invention. The network may be maintained by a server, or the network may be serverless. Similarly, any type of protocol (e.g., HTTP, FTP, ICMP, UDP, WAP, SIP, H.323, NDMP, TCP/IP) may be used to communicate across the network.

The Virtual Horse Racing Form

In traditional horse racing, the horse racing form is a record of significant events for a particular horse, including the horse's performance in previous races. For example, the traditional horse racing form may include the horse's name, age, gender, weight, color, sire (father), dam (mother), owner, breeder and trainer. Since the racing form is published for a particular race, the form may also include the race name, purse amount, the horse's gate position, the date of the race, the track name, the race number, the track surface, the race's distance, and the horse's jockey. The form may further provide in-depth information on the horse's past performances for the current racing season as well as for the horse's entire lifetime. This may include the number of races started and won, the number of races where the horse finished second, the number of races where the horse finished third, and the number of earnings for the season and for the horse's lifetime. The information may be organized into tables summarizing the horse's seasonal record and lifetime record. In addition, this same record of past performance may be further organized by race lengths or track conditions, such as wet, dry or turf tracks.

The racing form may also show a record of the horse's "in race" performance. This may include the horse's time at certain intervals in the race, and the distance the horse was leading the race by or was behind other horses running in the race. This information helps a handicapper visualize previous race performance to determine how the horse may perform relative to other horses, i.e. whether the horse is a frontrunner, stalker, closer, sprinter, or router in addition to how fast does the horse run.

In addition to information on a horse, the traditional racing form may also provide similar data for particular breeders, trainers and jockeys. Since a horse may change any of these three individuals over its lifetime, and since each of these three individuals comes with his own record of past performance and skill sets, this information is important to a handicapper keen on predicting impact of these factors on a horse's performance which in turn can impact the outcome of a race.

Those skilled in the relevant art will therefore appreciate that traditional print horse racing forms provide an incredible amount of data that a handicapper may analyze in order to place educated bets. Because of the large amount of data required for each horse, breeder, trainer and jockey, most efforts to simulate horse racing forms have relied on real-world data or randomly generated data, not real time data derived from the running of actual simulated races. It is an aspect of the present invention to utilize a computer-based mathematical model to compile all possible types of information found in a traditional print racing form, and to display this information to the user as a virtual horse racing form through the use of data derived from the running of the simulated races. This computer-based mathematical model may be called a "racing engine," and the virtual horse racing form that is displayed using the results produced by the racing engine may include the virtual horse attributes and information as depicted in FIG. 1.

FIG. 1 is an exemplary screenshot of a virtual horse racing form that may be displayed to a user. One having ordinary skill in the art will appreciate that all of the information shown in FIG. 1 is about a completely virtual horse, with no basis on any real world values. In FIG. 1, the name 101 of the virtual horse is "My Bride." My Bride has color characteristics 106 that describe her as "chestnut" colored. My Bride's gender 107 is "female," and her age 108 is "3" years old. The owner name 102 of My Bride is "I. Fonti." The breeder name 103 is "D. Lucas." The present jockey name 104 is "W. Young," and the present trainer name 105 is "B. Porter." One skilled in the art will appreciate that the owner name 102, the breeder name 103, the jockey name 104 and the trainer name 105 may also be handles or names of users of the present invention who have enrolled in the virtual horse racing system to fulfill these roles. One having skill in the art may also appreciate that these values may also be completely virtual.

The virtual horse racing form of FIG. 1 also illustrates that virtual horse My Bride's sire 109 is "Barbary Coast," and her dam 110 was "Bemybride." One skilled in the art will appreciate that the sire 109 and the dam 110 are also virtual horses that may be part of the virtual horse racing system.

FIG. 1 illustrates a virtual horse racing form for a particular virtual race. The race track 111 in this example is "Emerald Isle." The track surface 112 is "Dirt," and the race number 113 is "Race 1." The date 114 of this particular virtual race is "Feb. 17, 2007." The race name 116 in FIG. 1 is "Arlington." The race distance 117 is "12.0 Furlongs." In this example, the race purse 115 is "$200,000." In this particular virtual race, virtual horse My Bride's post position 120 is listed as "1," which means that virtual horse My Bride is racing out of gate number 1 in this particular race.

The virtual horse racing form of FIG. 1 also depicts data in a table format. For example, column 121 labeled "ST" refers to the number of races started. One skilled in the art would understand that jockey 104 (W. Young) has started in 13 races, and that trainer 105 (B. Porter) has started horses in 31 races. Column 122 labeled "W" refers to the number of races won. Column 123 labeled "P" refers to the number of races in which second place was won. "P" is an abbreviation for "placed." Column 124 labeled "S" refers to the number of races in which third place was won. "S" is an abbreviation for "show." The virtual horse's current earnings for the season as well as lifetime earnings are listed in column 126.

One having skill in the art will appreciate that other columns on the virtual horse racing form with the same header labels will represent the same type of data. For example, column 125 precedes the "Season" and "Lifetime" records for the number of races started, won, placed and shown by the subject virtual horse, My Bride. This data is also displayed in relation to the type of track surface used, as shown in column 127. Column 128 in FIG. 1 reflects the earnings on the different track surfaces.

One skilled in the art will also appreciate that a virtual horse racing form may also display data for a virtual horse's "in-race performance," similar to that found in real-world racing forms. This data may also be populated using the racing engine algorithm described further below. FIG. 2 depicts an in-race performance aspect of a virtual horse racing form. As shown, different columns will correspond to different types of information. FIG. 2 contains the following columns:

Column 201: the date of the virtual race

Column 203: the virtual race track identification number and surface

Column 205: the track condition

Column 207: the virtual race name

Column 209: the amount of the virtual race purse

Column 211: the initials of the virtual horse jockey

Column 213: the distance of the virtual race (in furlongs)

Columns 215, 217, 219 and 221 correspond to the times for four intervals or splits in the virtual race. This number represents the amount of time for the first virtual horse (leader) to reach the "in race" interval marker. For example, if the virtual race was a one mile race and the intervals were set for every quarter of the race, then the four times listed in columns 215-221 would reflect the amount of time it took the lead horse to reach the ¼ mile interval, the ½ mile interval, the ¾ mile interval and the mile (finish line) interval. Columns 223, 225, 227 and 229 correspond to the virtual horse's position and length behind the leader at the time when the fours intervals identified in columns 215-221 are reached. The larger base number represents the horse's position in the race (i.e. "2" means the virtual horse was in second place, "3" means the virtual horse was in third place, etc.) while the smaller exponent number represents the number of lengths behind the leading virtual horse at the respective interval (or ahead of the second placing virtual horse if the virtual horse is leading). For example, in column 223, the base number represents that the virtual horse was in second place at the first interval, 2.29 lengths behind the leading horse.

Columns 231, 233 and 235 correspond to the names of the first three virtual horses that finished in the race named in column 207.

One of ordinary skill in the art will appreciate that FIGS. 1 and 2 correspond to virtual race form data displayed for a specific virtual horse. The present invention may display the virtual horse racing form for a single horse, or may consolidate and display virtual horse racing forms for more than one horse. A person with ordinary skill in the art may use the virtual horse racing forms for more than one horse to assess the performance of those horses in a particular virtual race, and may engage in handicapping in order to predict the outcome of a particular virtual race. One skilled in the art will also appreciate that FIGS. 1 and 2 are merely exemplary formats, and that other formats with additional or less data may be used as virtual horse racing forms, without departing from the scope of this disclosure or the spirit of the present invention.

While the present invention is discussed in the context of a virtual horse race, a person having ordinary skill in the art will appreciate that the racing form aspect of the present invention can be comprised of data from other virtual races, including but not limited to dog, automobile or human races. One skilled in the art will recognize that the racing form data can be tailored for these different types of races without departing from the scope and spirit of the present invention.

The Racing Engine

In one embodiment, the present invention relies upon a software-based "racing engine" to generate the data for populating a display of the virtual horse racing form. The racing engine may provide the data for a three-dimensional display of the virtual horse race by running internal calculations and applying the results. The racing engine may also save the results of its calculations and update the virtual horse racing forms for each breeder, jockey, trainer and horse involved in race.

Figure 3:
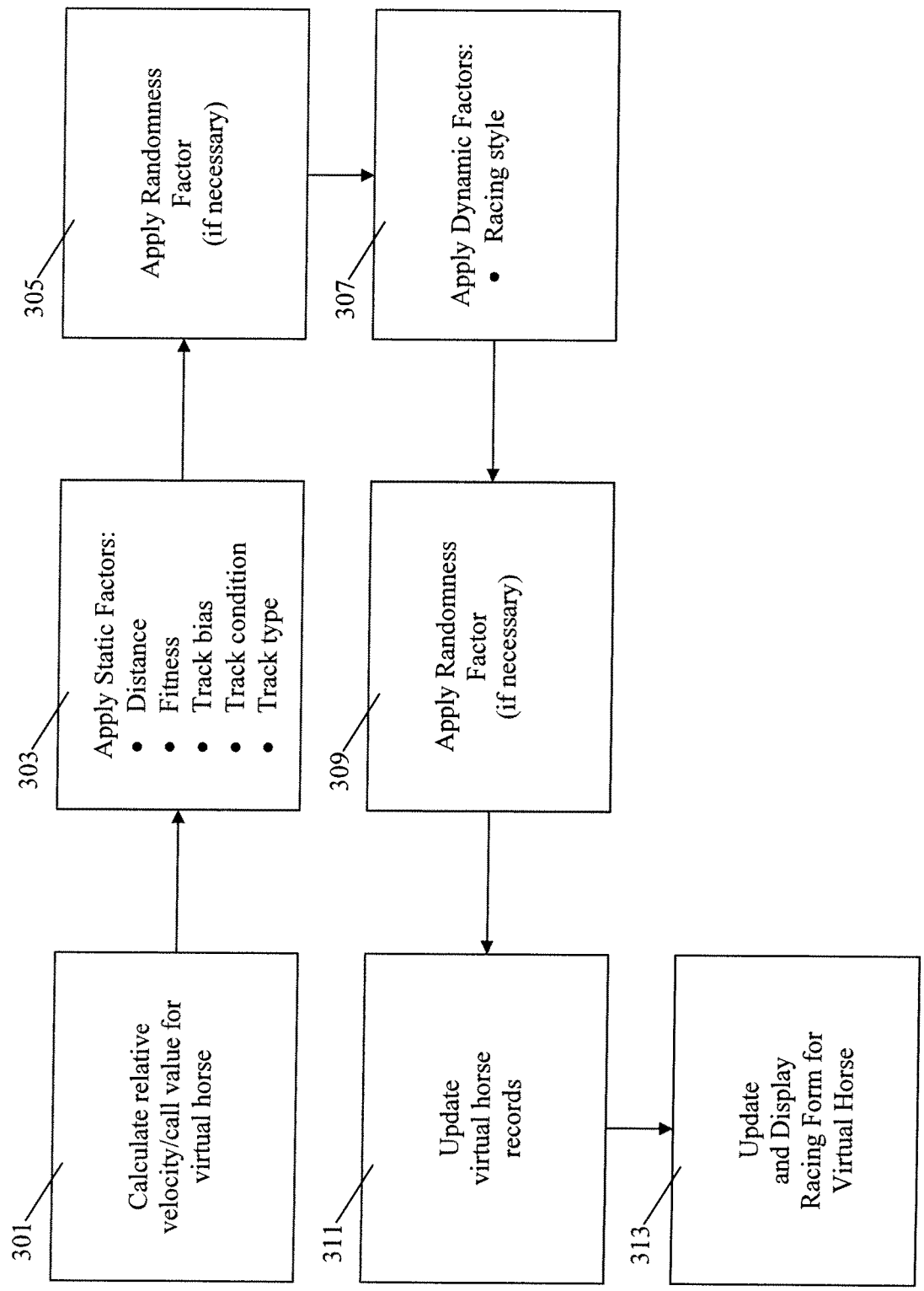
FIG. 3 is an exemplary flow diagram of an embodiment of the present invention.

The racing engine may make calculations using several independent factors that may be "static" or "dynamic." Static factors may be compiled simultaneously to reach a final result. Conversely, dynamic factors may involve results that rely upon other results; therefore, dynamic factors may need to be calculated independently. One skilled in the art will appreciate that the static and dynamic factors listed below are merely exemplary, and are not meant to limit the types of factors that may be used by the racing engine aspect of the present invention. One having skill in the art will also appreciate that other factors may be applied without departing from the scope of this disclosure or the spirit of the present invention. Exemplary steps for applying these factors are shown in FIG. 3. A person with ordinary skill in the art will appreciate that FIG. 3 is merely an example of how these factors may be applied, and that other methods are possible.

Static Factors

The racing engine may base its calculations on the relative velocities of each virtual horse selected for racing in a virtual race. As used herein, the representation of time and distance it takes for a virtual horse to travel from one predefined track location to another is a "call." (301 of FIG. 3). A person having ordinary skill in the art will appreciate that the present invention may include a stored database of data values assigned to each virtual horse. Static factors may include values for distance, fitness, track bias, track condition and track type. Other values may also be used, and that this list is merely exemplary and not meant to restrict the types of static factors available.

Using these static factors, the values for each factor may be adjusted or weighted depending upon the characteristics of the specific virtual horse. (303 of FIG. 3). In order to prevent results that are too predictable, the system may apply and generate a "randomness factor" to the static factors. (305 of FIG. 3). This randomness factor may be defined by a certain threshold or range to prevent unrealistic performance calculations for the virtual horse. This threshold may be further adjusted per race to provide a more reactive virtual race environment. This randomness factor and its associated predefined threshold range is described further below for each static factor. In general, however, the static factors may be adjusted in accordance with the following examples:

Distance: to calculate the adjustment or weight for the distance factor, the distance of the race may be compared with the preferred running distance of each virtual horse. If, for a group of virtual horses in the race, two of the virtual horse's preferred running distances are equal, then two or more calls for each horse may be increased. For example, if the horse's running style is a frontrunner, calls 1 and 2 are increased. If the horse's running style is a stalker, calls 2 and 3 are increased. If the horse's running style is a closer, calls 3 and 4 are increased. This adjustment therefore takes into account the personal running style for a particular virtual horse, adding to the realism to the invention and adding a point of analysis to a handicapper.

Fitness: the adjustment for the fitness factor is only applied if the fitness of each horse is less than the set value for a completely healthy and non-fatigued horse. This factor may then be used to account for a horse's fatigue from race to race. For example, fitness may be set at a value of 1.0. The calls for each horse may then be increased depending upon the style of the horse. For example, if the horse's running style is a frontrunner, calls 1 and 2 are increased. If the horse's running style is a stalker, calls 2 and 3 are increased. If the horse's running style is a closer, calls 3 and 4 are increased.

As in reality, a horse may not gain fitness between races. Instead, horses tend to tire after a race. Similarly, the fitness factor cannot increase the horse's calls, but may decrease the horse's calls. On a healthy horse, this factor will have no effect; however, if the horse's fitness is less than the set value 1.0, then its calls will be decreased mathematically. The algorithm: ((call value*fitness)−call value) might be applied to decrease the call for the less than fit horse. One skilled in the art will appreciate that this algorithm may be adjusted or combined with other algorithms in order to provide racing form and race results for aspects of the present invention.

Track Bias: the adjustment for the track bias factor is only applied to a virtual horse if the running style and track condition of the track bias match the running style of the horse and the condition of the track on which the race will be run. This factor accounts for some horses' ability to excel or underperform on certain types of tracks. As such, the track bias may define separate adjustment value or range combinations for each of the four calls. The actual amount of each increase may be equal to the adjustment value +/−a randomness factor constrained by the adjustment range. A separate value is calculated for each call, since each call may differ over time as the virtual horse progresses through a race.

Track Condition: the adjustment for the track condition factor is applied to horses whose preferred track condition is the same as the condition of the track on the day the race is run. This factor accounts for some horses' preference for certain track conditions. For example, if the horse's running style is a frontrunner, calls 1 and 2 may be increased. If the horse's running style is a stalker, calls 2 and 3 may be increased. If the horse's running style is a closer, calls 3 and 4 may be increased. The adjustment values and ranges control the value added to the horse's calls. Similar to other static factors, the actual increase may be equal to the adjustment value +/−a randomness factor constrained by the adjustment range.

Track Type: the adjustment for the track type factor is only applied to a horse if the preferred track type of the horse matches the type of track on which the race will be run. This factor accounts for some horses' preference for certain types of tracks. Similar to the above static factors, the adjustment to the calls will depend upon the horse's running style. Further, the actual amount of each increase may be equal to the adjustment value +/−a randomness factor constrained by the adjustment range.

Random: As discussed above, the present invention may introduce a randomness factor in order to account for the randomness sometimes found in real world horse races. For example, an adjustment for randomness may be applied to 1 out of every 100 horses. Each virtual horse may have an internal integer identifier. To determine if the random factor may be applied, a random number is selected between 1 and 100. If this random number matches the last two digits of the horse's identifier, a random adjustment is applied to all of the horse's calls. An administratively defined adjustment value and range control the value which is added to the horse's calls. The actual amount of increase may be equal to the adjustment value +/−a randomness factor constrained by the adjustment range. For example, if the adjustment value is 0.1 and the adjustment range is 0.05, the actual amount of increase will be any randomly selected value in the range of 0.05 to 0.15.

Dynamic Factors

Dynamic factors, or behavioral characteristics, may also be adjusted and weighted according to certain attributes of the horse. In one embodiment of the present invention, the racing engine calculates the dynamic factors after all of the static factors have been applied to the relative velocities. (307 of FIG. 3). The result of a dynamic factor computation may be a single adjustment value that may be applied to the horse's current velocity before the final comparison is made. The dynamic factor may be applied depending on the horse's racing style—whether the horse is a front runner, stalker or closer. Further, the dynamic factor may be adjusted using a randomness factor similar to the one defined for the static factors above. (309 of FIG. 3). One having ordinary skill in the art will appreciate that calculation and application of these dynamic factors simulates typically non-quantifiable horse behaviors. As described further below, horses may perform differently depending upon its running style. A horse may be a front runner, stalker or closer. These running styles may vary depending upon track conditions, race conditions or track characteristics. The present invention provides a simulation of a race while accounting for these changing behavioral characteristics. As such, each virtual horse's behavioral characteristics are captured and applied as dynamic factors.

Front Runner: for virtual horses classified as front runners, the dynamic factor may be applied to the lead horse if, during the previous call, the length of the horse's leading offset is greater than an administratively configurable value. An administratively defined adjustment value and range control the value that is added to the horse's current call. The actual amount of increase may be equal to the adjustment value +/−a randomness factor constrained by the adjustment range.

Stalker: for virtual horses classified as stalker horses, the dynamic factor may be applied to all non-lead virtual horses in the race if, during the previous call, the length of the horse's trailing offset is less than an administratively configurable value. An administratively defined adjustment value and range control the value which is added to the horse's current call. The actual amount of increase may be equal to the adjustment value +/−a randomness factor constrained by the adjustment range.

Closer: for virtual horses classified as closer horses, the dynamic factor may be computed during the final call. This factor may be applied after all of the static calls have been computed. In one embodiment, this factor is only applied if the latest computation for the current call is within an administratively configured percentage of the mathematical average of the last N races. An administratively defined adjustment value and range control the value which is added to the horse's current call. The actual amount of increase will be equal to the adjustment value +/−a randomness factor constrained by the adjustment range.

Updating

In addition to performing the calculations of the static and dynamic factors, the racing engine may also be responsible for updating the records associated with each virtual horse. (311 of FIG. 3). The racing engine will determine the results of a virtual race, and may rank, or place, the virtual horses accordingly. Consequently, the purse amount for the virtual race will need to be distributed by an accounting aspect of the racing engine. For example, if the purse is to be divided into four parts, then the owner of the winning (first place) horse may receive 60% of the purse. The owner of the place (second place) horse may receive 22% of the purse. The owner of the show (third place) horse may receive 12% of the purse. Finally, the owner of the fourth place horse may receive the remaining 6% of the purse. The accounting aspect calculates the exact amount of money each owner should receive after the race and transfers funds from a house account to each member's account. One skilled in the relevant art will appreciate that other purse distributions are possible as well which may also be calculated by the accounting aspect of the present invention.

A horse call results aspect of the racing engine may be responsible for saving the results of the race to a database. For each virtual horse, the times for each of the four calls may be stored, in addition to each virtual horse's position, distance from the competing position, and the velocity of each call.

Other aspects of the present invention may cause other data values to be stored, including the last raced date of each virtual horse in the race, the position of each virtual horse in a race, and the overall class of each virtual horse. In one embodiment of the present invention, each virtual horse may be ranked by a class A through E (with A being the highest class). As a virtual horse wins races, the class to which it belongs can increase. A horse update aspect of the present invention may be responsible for determining when a horse's class should be upgraded and when to enact the update. In one embodiment, four administratively-defined thresholds control this ranking process. For example, to move from a D class to a C class or a C class to a B class, a virtual horse must have collected a certain number of total wins in its lifetime. In a further example, to move from a B class to an A class, a horse must exceed a certain win percentage for the current season. One will appreciate that a horse may also be downgraded from an A class to a B class if its win percentage for the current season falls beneath a separate threshold. Similarly, each virtual jockey may be ranked by a class A through E (with A being the highest class). In this fashion, a virtual jockey may increase or decrease in class depending upon his performance in successive virtual races. An aspect of the present invention also provides a class system for virtual trainers as well. One will appreciate that aspects of the present invention provide for users, who may be competing as virtual trainers, jockeys, breeders or handicappers of the virtual horse races, to increase or decrease in rank, providing an incentive for better performance.

As a result of the compilation of virtual race calculations, the present invention may generate a number of data points that may be summarized using statistics. These statistical results may also be stored by the present invention for referral during the lifetime or racing season for the horse, jockey, owner, trainer or breeder.

Using the data calculated as shown, an embodiment of the present invention organizes the data for display as a digital virtual horse racing form. (313 of FIG. 3). The racing engine therefore provides all of the information that may be useful to a handicapper or user of the present invention, including information on a virtual horse's speed, pace, form, class, post position and other factors used by handicappers. The horse racing form may be presented to a user and analyzed in order to make educated bets on a virtual horse race. The virtual horse racing component of the present invention therefore captures all of the information typically found in a traditional print racing form. Since all data is compiled by the racing engine, the present invention provides a completely virtual horse racing environment, since no real horses or jockeys are involved in the generation of data for the virtual horse racing form. One skilled in the relevant art will appreciate that once the virtual horse racing form is generated, it may be used for other applications that form part of the present invention.

Three-Dimensional Display

An embodiment of the present invention may involve a three-dimensional display of a virtual horse race that may work in conjunction with the virtual horse racing form and/or the racing engine aspects of the present invention. The virtual horse race may be played by simultaneous users over the internet. In this embodiment, players may simulate almost every aspect of real horse racing in a virtual environment. According to one aspect of the present invention, the virtual horse racing environment may permit the following actions:

Buying and Selling Horses

In one embodiment of the present invention, players may be able to buy virtual horses from other players or from the system. In addition to buying and selling horses in direct one-on-one transactions, players may also have the ability to buy and sell horses though auctions.

Breeding

An aspect of the present invention may allow a player to create a new virtual horse by breeding from a set of virtual horses in the system. In this embodiment, a player may breed from any other player's virtual horse or from a set of virtual horses created by the system. During the breeding process, a new horse may be generated using a combination of weighted random values and the values of the sire and the dam. In one embodiment, if both the sire and the dam are sprinters, the probability that the foal will be a sprinter is much higher than if only a single parent is a sprinter.

Training

In one embodiment of the present invention, a player may train his/her horse or register his/her horse with another trainer to increase the stamina, speed, and agility attributes of a horse. Each trainer may licensed with a set of activities that will affect particular aspects of the horses he/she is training.

Purchasing Upgrades

An embodiment of the present invention may permit players to purchase upgrades for their horses, i.e. aluminum horse shoes, which may randomly impact their horse's abilities in certain areas. In one embodiment, the horse's speed, strength, stamina, etc., may be impacted through these upgrades.

Racing

In one embodiment of the present invention, races may be created by the system or by players, with race results calculating using the racing engine aspect described previously. An administrator or player may specify registration criterion that could limit the types of horses that can run in any particular virtual race. In one aspect, players may enter and race their virtual horses in any race for which their horse qualifies. According to an embodiment, there may be many virtual races in which a player can run his or her virtual horse. The present invention may have many different tracks on which to race, and additional tracks may be created by an administrator of the system.

Many factors may determine how each virtual horse performs in a virtual race. According to one embodiment of the present invention, these may include, but are not limited to the virtual horse's running style (frontrunner, stalker or closer), whether the horse is a sprinter or router, the preferred track type (dirt or turf), the preferred track condition (wet, damp, dry), and the race distance. In addition to each of these factors, the present invention may use a set of constrained random values to ensure each race mimics the unpredictability of real horse racing.

Figure 4:
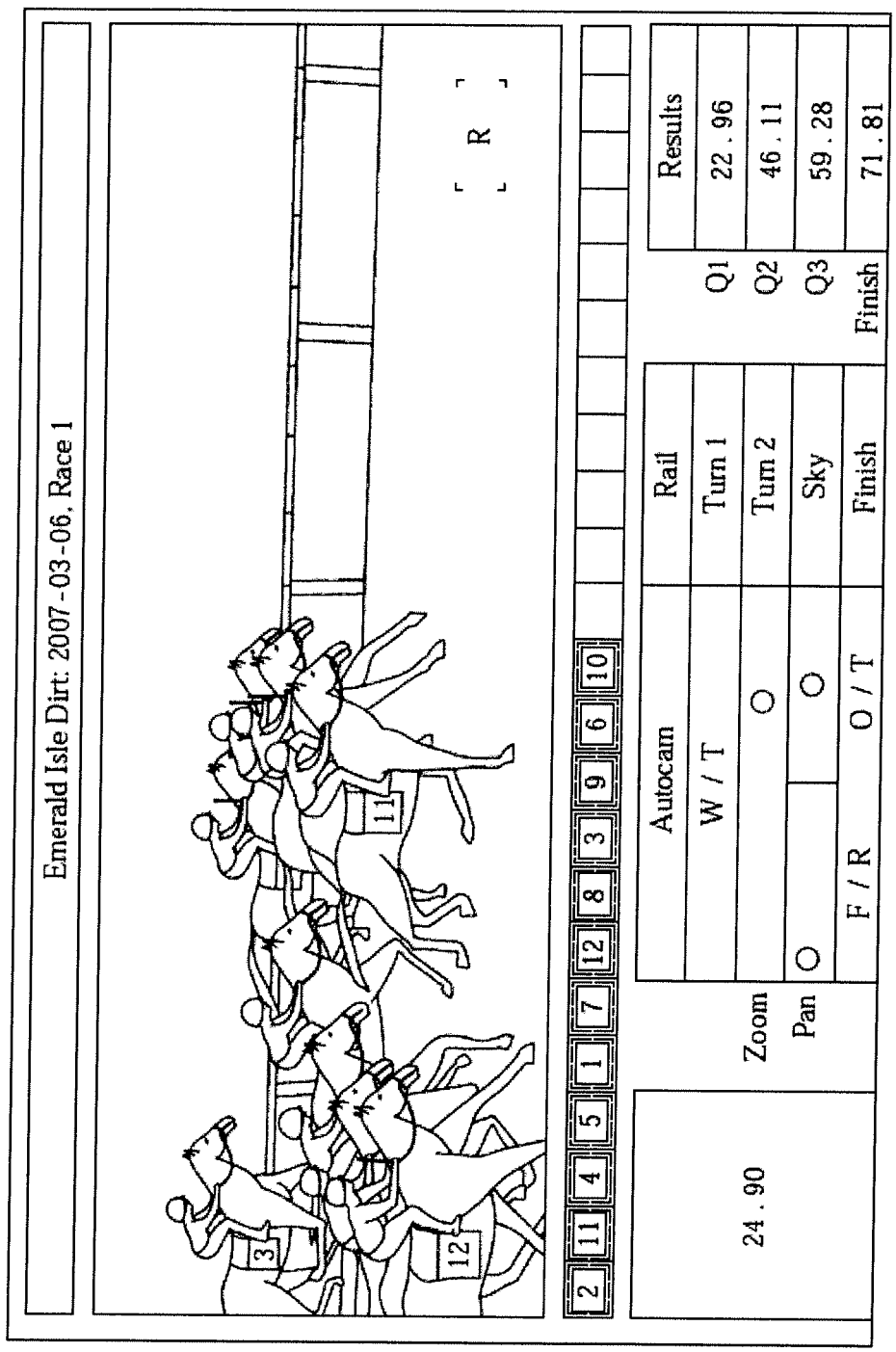
FIG. 4 is an exemplary screenshot showing a virtual race embodiment of the present invention.

Once a race begins, a player may watch the race using a 3D race viewer to visually see the running of the race, according to one aspect. The 3D viewer may provide the player/spectator with the ability to view the race from multiple points around the racetrack, in addition to viewing the race from the jockey's perspective. An example of one viewing perspective is shown in FIG. 4. The virtual racetracks may also have a billboard across from the finish line where customized ads can be presented during the race for vendor sponsored races and events.

According to one aspect of the present invention, the display of the virtual race may offer the following features:

Racing Calendar

Each virtual racetrack may have a racing calendar associated with it that may provide multiple virtual races per day in the same manner one finds at real race tracks. According to one embodiment, there may be many races in which a player can run his or her virtual horse. Players may register their virtual horses for each race based on the horse's eligibility to meet the race conditions in the same manner as real world racing.

Series

A series of races may be set up that may consist of many virtual races over the course of a season. The virtual races may be run as single events that may be tied together from an awarded point perspective or may be run in a tournament fashion. In one embodiment, in order to be eligible for the next round, each virtual horse may be qualified based on his or her performance in the previous rounds. Trophies and prizes can be distributed to the horse (and its trainer, owner, and jockey) if he or she wins the series.

Sponsored Races/Series

According to one embodiment, sponsored races/series may be series that may be tied specifically to a vendor and/or vendor's product. Commercials, ads, banners, billboards, etc., may be delivered to the player/spectator before, during and after the virtual race in the same manner as if the player/spectator was watching a real race on television. Additionally, a company may sponsor an entire series of races (i.e. a tournament) in which prizes are awarded to the top finishers of the race/series as a means to market their products. In this aspect, the present invention may offer an advertising or marketing revenue source for the hosting service provider.

Casino Embodiment

Another embodiment of the present invention may be used in a casino environment. According to this embodiment, the present invention may involve a closed system environment with the functionality to operate without any human intervention. The present invention may perform a portion of or all of the functions that a player would perform in the multiplayer embodiment previously described. According to this embodiment, the present invention may:

Independently create and name unique virtual horses with random attributes

Independently create, name and schedule virtual races on the racing calendar providing unique virtual races from year to year Independently register virtual horses into scheduled virtual races based on registration criteria providing unique races from year to year Independently train virtual horses between virtual races Independently run and present scheduled virtual races Independently store virtual race results and historical information Independently create and present virtual horse racing forms for scheduled virtual races The present invention may apply the racing engine and the virtual horse racing form to the casino environment, providing a vehicle for handicappers to determine which virtual horse to wager upon. The virtual form can be provided for display on a screen, or printed out. The racing engine described previously can also by used to calculate odds or wagering information for users, which may also be displayed or announced in order to aid in handicapping the virtual horse races.

An embodiment of the present invention envisions displaying virtual races in a 3D format on a television or CRT screen at the scheduled time. Virtual races may be calculated milliseconds before their display, which may prevent improper tampering with wagering. One skilled in the relevant art would appreciate that from the end user "handicapper" perspective, the experience may be identical to what would be experienced when simulcast races are viewed at real-world racetracks throughout the country, with the exception that players would be viewing and wagering on virtual horses. According to this aspect, the present invention thus captures the excitement of a real-world horse race and the skill of handicapping based upon a real-world racing form, but in an entirely virtual simulated environment.

What is disclosed is a complete virtual horse racing environment, from the storage, display and generation of a virtual horse racing form, to the generation and display of a virtual horse race, to allowing users to participate as handicappers, observers, trainers, breeders or owners. One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, certain mathematical operations are described above that exemplify how a particular virtual horse racing form is generated. One will appreciate that the present disclosure includes any type of mathematical operation that may be used to generate a virtual horse racing form, so long as the virtual horse racing form is based upon completely virtual horses and has no origination in values generated from real world horse races or real world horses.

What is claimed is:

1. A computer-implemented method for generating and displaying a horse racing form for use with a computer-implemented horse race simulation system comprising:

identifying to a processor a first group of virtual horses to run in a particular computer-implemented horse race simulation, the first group of virtual horses selected from a plurality of virtual horses created using the processor, each virtual horse having associated data stored in data storage accessible to the processor, the stored associated data including virtual attributes associated with the virtual horse including physical attributes, breeding attributes, and performance attributes including results from the processor running previous horse race simulations using a plurality of combinations of the plurality of virtual horses, the results from the previous horse race simulations including split times;

prior to running the particular horse race simulation, processing the stored associated data by the processor to generate for display to the user on a computer display a portion of the stored associated data for each of the first group of virtual horses as a single integrated document in a racing form format, the displayed single integrated document in racing form format including at least one data table containing at least the portion of the stored associated data about all of the virtual horses in the first group and the portion of the stored associated data organized and normalized based on the physical attributes, the breeding attributes, and the performance attributes including split times associated with each of the virtual horses in the first group;

prior to running the particular horse race simulation, and after the generation and display of the single integrated document in racing form format to the user on the computer display, receiving by the processor a selection from the user of one virtual horse in the first group as the user's pick to win, place or show in the particular horse race simulation;

running by the processor the particular horse race simulation based at least in part on the virtual attributes of the virtual horses; and transmitting the results of the particular horse race simulation by the processor to the computer display of the user.

2. The method of claim 1, wherein the stored associated data includes data corresponding to performance attributes of the virtual horses in at least one previous horse race simulation on a track with specified track characteristics.

3. The method of claim 1, wherein the stored associated data for a virtual horse is selected from a list consisting of a race name, a race track name, a race track condition, a race number, a race date, a race type, a race purse amount, a race distance, a previous race, a gate number, a set of normalized split times at four segments of each race, a normalized placement at each split time, a first normalized distance measured from a virtual horse that is leading the race at each split time, a second normalized distance measured from a virtual horse that wins the race at each split time, the virtual horse's name, the virtual horse's age, the virtual horse's sex, the virtual horse's color, the virtual horse's owner, the virtual horse's breeder, the virtual horse's jockey, the virtual horse's trainer, the virtual horse's trainer's record, the virtual horse's sire, the virtual horse's dam, the virtual horse's record for different track types, the virtual horse's earnings for different track types, the virtual horse's season record, the virtual horse's lifetime record, the virtual horse's performance at a previous horse race simulation, and the virtual horse's current prize earnings.

4. The method of claim 1, wherein the computer-implemented horse race simulation system is selected from the group consisting of a web-based application, a casino environment, a closed single institution, a single computing environment and an open virtual world environment.

5. A method for a user to wager upon a computer-implemented horse race simulation comprising:

identifying to a processor a first group of virtual horses to run in a particular computer-implemented horse race simulation, the first group of virtual horses selected from a plurality of virtual horses created using the processor, each virtual horse having associated data stored in data storage accessible to the processor, the stored associated data including virtual attributes associated with the virtual horse including physical attributes, breeding attributes, and performance attributes including results from the processor running previous horse race simulations using a plurality of combinations of the plurality of virtual horses, the results from the previous horse race simulations including split times;

prior to running the particular horse race simulation, processing the stored associated data by the processor to generate for display to the user a single integrated document in racing form format for each of the first group of virtual horses, the single integrated document in racing form format including at least one data table containing at least a portion of the stored associated data about all of the virtual horses in the first group and the portion of the stored associated data organized and normalized based on the physical attributes, the breeding attributes, and the performance attributes including split times associated with each virtual horse in the first group;

after generation and display of the single integrated document in racing form format by the processor and prior to running the particular horse race simulation, receiving from the user at a wagering system a wagering input predicting a performance of at least one virtual horse in the first group of virtual horses in the particular horse race simulation.

6. The method of claim 5, wherein the stored associated data includes data corresponding to performance attributes of the virtual horses in at least one previous horse race simulation on a track with specified track characteristics.

7. The method of claim 5, wherein the stored associated data for a virtual horse is selected from the group consisting of a race name, a race track name, a race track condition, a race number, a race date, a race type, a race purse amount, a race distance, a previous race, a gate number, a set of normalized split times at four segments of each race, a normalized placement at each split time, a first normalized distance measured from a virtual horse that is leading the race at each split time, a second normalized distance measured from a virtual horse that wins the race at each split time, the virtual horse's name, the virtual horse's age, the virtual horse's sex, the virtual horse's color, the virtual horse's owner, the virtual horse's breeder, the virtual horse's jockey, the virtual horse's trainer, the virtual horse's trainer's record, the virtual horse's sire, the virtual horse's dam, the virtual horse's record for different track types, the virtual horse's earnings for different track types, the virtual horse's season record, the virtual horse's lifetime record, the virtual horse's performance at a previous race simulation, and the virtual horse's current prize earnings.

8. The method of claim 5, wherein the wagering system is selected from the group consisting of a web-based application, a casino environment, a closed single institution, a single computing environment and an open virtual world environment.

9. The method of claim 5, wherein the single integrated document in racing form format is a web page displayed on a computer display.

10. The method of claim 5, wherein the single integrated document in racing form format is a printed form.

11. A computer-implemented method for generating and displaying a racing form for use with a computer-implemented race simulation system comprising:

identifying to a processor a first group of virtual contestants to run in a particular computer-implemented race simulation, the first group of virtual contestants selected from a plurality of virtual contestants created using the processor, each virtual contestant having associated data stored in data storage accessible to the processor, the stored associated data including virtual attributes associated with the virtual contestant including physical attributes, breeding attributes, and performance attributes including results from the processor running previous race simulations using a plurality of combinations of the plurality of virtual contestants, the results from the previous race simulations including split times;

prior to running the particular race simulation, processing the stored associated data by the processor to generate an output for displaying a portion of the stored associated data for each of the first group of virtual contestants as a single integrated document in a racing form format, the single integrated document in racing form format including at least one data table organized and normalized based on the physical attributes, breeding attributes, and performance attributes including split times associated with all of the virtual contestants in the first group; and prior to running the particular race simulation, and after the processor generates the displayed output of the stored associated data as the single integrated document in racing form format, receiving a selection by the user, based upon the data in the displayed output, of a predicted placement of at least one virtual contestant in the first group of virtual contestants when the particular race simulation is run.

12. The method of claim 11, wherein the system for accepting user selections of the virtual contestant placement is selected from the group consisting of a web-based application, a casino environment, a closed single institution, a single computing environment and an open virtual world environment.

13. The method of claim 11, wherein the stored associated data includes data corresponding to performance attributes of the virtual contestants in at least one previous race simulation on a track with specified track characteristics.

14. The method of claim 11, wherein the stored associated data for a virtual contestant is selected from a group consisting of a race name, a race track name, a race track condition, a race number, a race date, a race type, a race purse amount, a race distance, a previous race simulation, a set of normalized split times at four segments of each race, a normalized placement at each split time, a first normalized distance measured from a virtual contestant that is leading the race at each split time, a second normalized distance measured from a virtual contestant that wins the race at each split time, the virtual contestant's name, the virtual contestant's age, the virtual contestant's sex, the virtual contestant's owner, the virtual contestant's trainer, the virtual contestant's trainer's record, the virtual contestant's record for different track types, the virtual contestant's earnings for different track types, the virtual contestant's season record, the virtual contestant's lifetime record, the virtual contestant's performance at a previous race simulation, and the virtual contestant's current prize earnings.

15. The method of claim 11, wherein the single integrated document in racing form format is a display on a computer display.

16. The method of claim 11, wherein the single integrated document in racing form format is a printed form.

* * * * *